(12) United States Patent
Hussain

(10) Patent No.: US 6,493,642 B1
(45) Date of Patent: Dec. 10, 2002

(54) METHOD OF DETERMINING MASS FLOW RATE BY THE CORIOLIS PRINCIPLE

(76) Inventor: Yousif A. Hussain, 25, Thorburn Road, Weston Fevell, Northampton, NN3 3DA (GB)

(*) Notice: Subject to any disclaimer, the term of this patent is extended or adjusted under 35 U.S.C. 154(b) by 0 days.

(21) Appl. No.: 09/330,789

(22) Filed: Jun. 11, 1999

(51) Int. Cl.$^7$ .................................................. G01F 1/84
(52) U.S. Cl. ........................ 702/45; 702/72; 702/100; 702/189; 73/861.356
(58) Field of Search .......................... 702/45, 46, 48, 702/50, 54, 56, 72, 85, 100, 103, 106, 114, 183, 188, 189, FOR 103, FOR 104, FOR 110, FOR 127, FOR 128, FOR 134, FOR 155–FOR 163, FOR 170, FOR 171; 377/21; 73/861.354–357, 861.02, 861.03, 1.16, 1.34, 1.35, 1.57, 1.59, 1.82; 700/281, 282; 327/2–5, 7, 9, 233, 236

(56) References Cited

U.S. PATENT DOCUMENTS

| 5,231,884 A | * | 8/1993 | Zolock | 73/861.356 |
| 5,469,748 A | | 11/1995 | Kalotay | 73/861.38 |
| 5,578,764 A | * | 11/1996 | Yokoi et al. | 73/861.356 |
| 5,767,665 A | * | 6/1998 | Morita et al. | 73/861.356 |

FOREIGN PATENT DOCUMENTS

| EP | 0 275 367 A2 | 7/1988 |
| EP | 0593 623 B1 | 4/1994 |
| EP | 0 702 212 A2 | 3/1996 |
| EP | 0 791 807 A2 | 8/1997 |

* cited by examiner

Primary Examiner—Hal Wachsman
(74) Attorney, Agent, or Firm—Cesari and McKenna, LLP

(57) ABSTRACT

A method of correcting the phase difference between first and second data signals from a Coriolis flowmeter using three parallel input stages which process the signals and a pair of phase detectors for receiving the signals by delivering the first and second signals continuously to first and second input stages, respectively, to produce processed data signals therefrom while delivering the first and second signals alternately to the third input stage to produce a processed data signal therefrom, routing the processed data signals to at least one additional phase detector to produce first and second corrective phase differences, and producing a corrected phase difference by summing the uncorrected phase difference and the difference between the first and second corrective phase differences. A circuit for carrying out the method is also disclosed.

8 Claims, 2 Drawing Sheets

---

Deliver First And Second Data Signals To The First And Second Input Stages 3 And 4, Respectively, And Alternately To The Third Input Stage 5 To Produce Processed Data Signals From The Stages

↓

Sample And Route The Processed Data Signals From The First And Second Stages To Phase Detector $7_a$ To Produce An Uncorrected Phase Difference

↓

Sample And Route The Processed Data Signals From The First And Third Stages And Alternately From The Second And Third Stages To Phase Detector $7_b$ To Produce A Second Corrective Phase Difference

↓

Sum The Uncorrected Phase Difference And The Difference Between The First And Second Corrective Phase Differences To Produce The Corrected Phase Difference.

Deliver First And Second Data Signals To The First And Second Input Stages 3 And 4, Respectively, And Alternately To The Third Input Stage 5 To Produce Processed Data Signals From The Stages

Sample And Route The Processed Data Signals From The First And Second Stages To Phase Detector $7_a$ To Produce An Uncorrected Phase Difference

Sample And Route The Processed Data Signals From The First And Third Stages And Alternately From The Second And Third Stages To Phase Detector $7_b$ To Produce A Second Corrective Phase Difference

Sum The Uncorrected Phase Difference And The Difference Between The First And Second Corrective Phase Differences To Produce The Corrected Phase Difference.

FIG. 2

METHOD OF DETERMINING MASS FLOW RATE BY THE CORIOLIS PRINCIPLE

BACKGROUND OF THE INVENTION

This invention relates to a method for determining the mass flow rate by the Coriolis principle whereby, with the aid of at least two process-variable detectors, at least two data signals reflecting the movements of a Coriolis line are generated, the said data signals are processed with the aid of at least three parallel input stages, each stage having an input contact, the phase differences between the processed data signals are determined with the aid of at least two phase detectors, the data signals are, at least in part, fed to the input contacts of the input stages with the aid of at least one first check switch, a correcting circuit derives from the phase differences between the processed data signals a corrected phase difference between these data signals, and with the aid of an evaluation unit, the mass-flow rate is established on the basis of the corrected phase difference.

The method used for measuring the phase difference between two data signals, constituting the underlying concept of the procedure according to this invention for determining the mass flow rate according to the Coriolis principle, can also be employed in connection with other measuring processes where it is important to define the phase difference between two data signals.

The fundamental objective of this invention is an improved signal evaluation method for Coriolis-type mass flowmeters. The data signals provided by these Coriolis mass flowmeters are in the form of two periodic voltages with a phase shift that is proportional to the mass flow rate. The accuracy of the mass flowmeters is thus a function of the determination of the phase difference. For accuracy requirements common in the industry, the resolution of the phase difference must be approximately $4 \times 10^{-5}$ degrees and these requirements are becoming increasingly stringent. A major obstacle in meeting these requirements is the temperature-dependent phase shift encountered in the analog part of the evaluation circuitry, and especially in the input stage, but also in the leads between the process-variable detectors and the input stages. U.S. Pat. No. 4,817,448 describes an example of a method for correcting these phase shifts. That method employs a polarity reversal circuit for periodically switching the polarity of the data signals between the input states. Then, if temperature changes are not a factor, the phase detector supplies precisely inverted values respectively. However, if the input stages are exposed to temperature influences respectively, there will indeed be different phase shifts, as a result of which the phase-difference values supplied by the phase detector upon polarity reversal are no longer precisely inverted relative to each other. From this phase-difference deviation a zeroing signal is derived which then serves to correct the phase differences detected, thus meeting the accuracy requirements in measuring the phase difference.

The problem with this earlier method for determining the mass flow rate by the Coriolis principle is that polarity reversal produces transients which prohibit the evaluation of the phase detector readings for a fairly significant length of time. This is particularly undesirable when the mass flow data are used for controlling feedback loops, since in that case, it is impossible at certain time intervals to determine the controlled variable. After the transient which appeared during the transitional period in the determination of the phase difference have abated, this earlier method provides for the second data signal to be switched to the input contact of the remaining input stage so that the phase detector which up to that point had transmitted the uncorrected phase difference between the two data signals, will now measure the difference between the temperature-dependent phase shift in the first-mentioned input stage and the third input stage. Since in that earlier method, addressed by this invention, the phase-shift differences between the first and third input stages and the second and third input stages are measured, the stored phase-shift differences concerned can be used for correcting the uncorrected phase difference between the first and the second data signal present at the first or, respectively, second phase detector.

Another example of a method for determining the mass-flow rate according to the Coriolis principle, on which this invention is based, is described in EP 0 593 623 B1. According to that earlier method, first and second input signals are alternated, by way of a first check switch, between the input contacts of first and the second input stages while one of the two data signals remains continuously connected to the input contact of a third input stage. In an implementation of this earlier method, the processed data signals of the first input stage and the third input stage are continuously fed to a first phase detector while the processed data signals of the second input stage and the third input stage are continuously fed to a second phase detector. If, for example, the second data signal is continuously connected to the input contact of the third input stage, one of the input contacts of the first or second input stage will always have to receive the first data signal. In this earlier concept, the input contact of the remaining input stage temporarily receives the second data signal, so that the second data signal processed by the third input stage and the data signal processed by the remaining input stage are fed to one of the phase detectors, making it possible with the aid of this phase detector to determine the difference in the temperature dependent phase shifts in the input stages concerned. The remaining phase detector receives the first data signal processed by an input stage as well as the second data signal processed by the third input stage, so that this phase detector measures the uncorrected phase difference between the first and the second data signals. At this point in the approach described, the first data signal is also fed to the input contact of the remaining input stage so that, during a transitional period, both phase detectors transmit the uncorrected phase difference between the two data signals. After the transients which appeared during the transitional period in the determination of the phase difference have abated, this earlier method provides for the second data signal to be switched to the input contact of the remaining input stage so that the phase detector which up to that point had transmitted the uncorrected phase difference between the two data signals, will now measure the difference between the temperature-dependent phase shift in the first-mentioned input stage and the third input stage. Since in that earlier method, addressed by this invention, the phase-shift differences between the first and third input stages and the second and third input stages are measured, the stored phase-shift differences concerned can be used for correcting the uncorrected phase difference between the first and the second data signals present at the first or, respectively, second phase detector.

This means that the earlier method, to which this invention refers, produces a measurement of the phase difference between two data signals which has been corrected for the temperature dependent phase shifts induced in the input stages. At the same time, the data signal for the phase difference is continually available because, when the data signals are switched from one input stage to another input stage by means of the check switch, the transients produced in the process can be allowed to abate before using the output signal of the other phase detector instead of the output signal of the one phase detector as the reading for the uncorrected phase difference between the first and the second data signals.

The problem with the earlier method for determining the mass-flow rate by the Coriolis principle, on which this invention is based, is that the data signals are fed to the input contacts of the input stages by way of a relatively complicated check switch in what is a particularly interference-prone section preceding the input stages. Cross-talk between the data signals is therefore not altogether avoidable. Moreover, the earlier method does not allow for a design adaptation of the phase detectors to varying requirements since both phase detectors are employed in alternating fashion for measuring the uncorrected phase difference and determining a corrective phase difference.

SUMMARY OF THE INVENTION

This invention is, therefore, aimed at improving the earlier method for determining the mass flow rate based on the Coriolis principle, in such a manner as to provide greater measuring accuracy while reducing the complexity of the electronics.

According to this invention, the inherent problem indicated above is solved with a design whereby the first phase detector serves to continuously measure the uncorrected phase difference between the first data signal processed with the aid of the first input stage and the second data signal processed with the aid of the second input stage, while at least periodically measuring a first corrective phase difference between the first data signal processed in the first input stage and the first data signal processed in the third input stage and, in alternating fashion, a second corrective phase difference between the second data signal processed with the aid of the second input stage and the second data signal processed in the third input stage, and the correction circuitry serves to determine the corrected phase difference between the data signals derived from the sum of the uncorrected phase difference and the difference between the first and the second corrective phase differences.

This invention ensures that, prior to reaching the input stages, the data signals only need to be alternately fed to the input contact of the third input stage by means of a simple check switch. This simplifies the electronics otherwise needed for measuring accuracy in the particularly sensitive area in front of the input stages. Moreover in the design according to this invention, the uncorrected phase difference is determined by the first phase detector, and the corrective phase differences by at least one second phase detector. Accordingly, these phase detectors can be optimally adapted to any given requirements.

In a particularly simple implementation of the method according to this invention, a second check switch shunts the processed data signals to the input contacts of the second phase detector and the second phase detector serves to measure the first and the second corrective phase difference. Alternatively it would be possible, albeit more expensively, to use the second phase detector exclusively for determining the first corrective phase difference while employing a third phase detector for determining the second corrective phase difference.

If prior to the measurement of the phase differences the processed data signals are digitized, any additional influence by temperature susceptible components is minimized since the digital measurement of the phase differences is totally unaffected by temperature influences.

Of course, if prior to the measurement of the phase differences the processed data signals are to be digitized, the phase detectors must be of the digital type. In this context, one may want to employ Fourier transform-processed data signals for measuring the phase differences as described for instance in EP 0 282 552 B1.

The processed data signals can be sampled in synchronous or asynchronous fashion. Asynchronous sampling offers the advantage of permitting the use of fewer analog/digital converters which, of course, requires faster analog/digital converters.

Since the effect of temperature variations on the phase shifts in the input stages displays a relatively large time constant, it provides the opportunity to periodically interrupt the corrected phase difference measurements, having the ability during these interruptions, without any loss of accuracy, to utilize the stored corrective phase difference values for correction purpose while the freed-up capacities of the analog/digital converters are available for digitizing other variables, for instance the temperatures of the Coriolis line.

There are various ways in which the procedural concept according to this invention for determining the mass flow rate according to the Coriolis principle can be designed and enhanced. In this connection, reference is made to the dependent claims, and to the description and drawing of a preferred implementation example.

BRIEF DESCRIPTION OF THE DRAWINGS

In the drawings,

FIG. 2 is a flow chart showing the method steps.

DETAILED DESCRIPTION OF AN ILLUSTRATIVE EMBODIMENT

Figure 1:
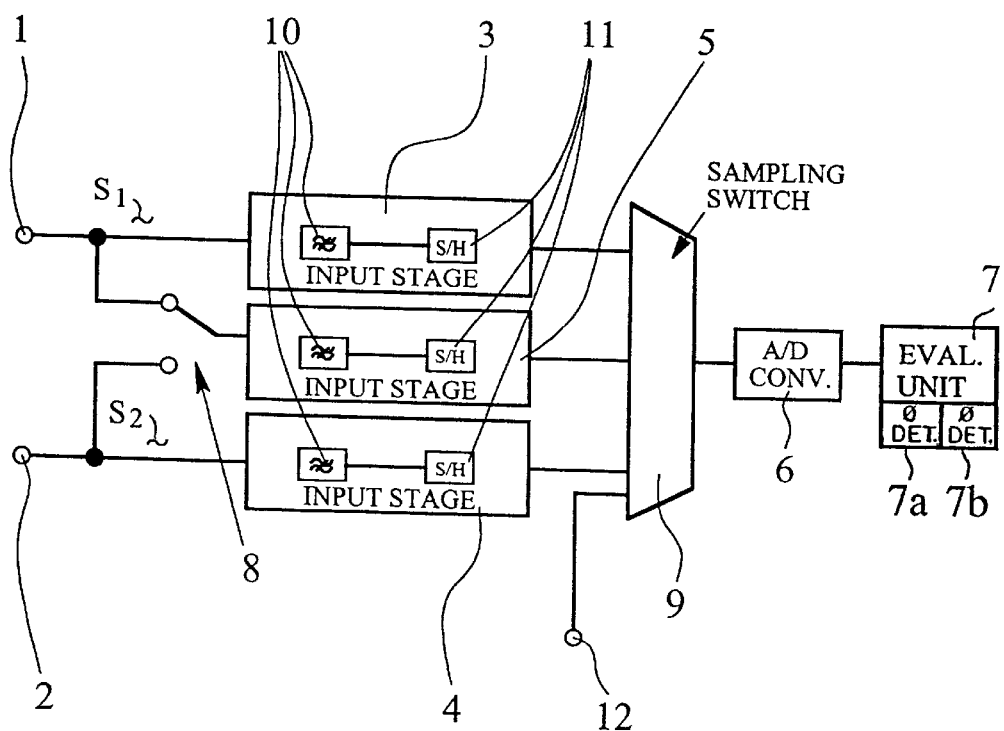
FIG. 1 shows an example of a device which implements the method according to this invention.

In the example of a device implementing the procedure according to this invention, illustrated in the drawing FIG. 1, two input contacts 1, 2 receive two data signals $S_1$ and $S_2$ reflecting the movement of a Coriolis line, which signals are generated by means of two process-variable detectors, not shown. In the example illustrated, the two data signals are processed with the aid of three parallel input stages 3, 4, 5. In this particular example, the phase detectors 7a and 7b determining the phase differences between the processed data signals are implemented in a digital evaluation system 7 which is connected in series with an analog/digital converter 6. The alternating transfer of the data signals to the input contact of the third input stage 5 is performed by a simple check switch 8 in the form of a two-point control switch with the input contacts 1 and 2 while its output is connected to the input of the third input stage 5. In the design example shown, the correction circuitry which serves to provide the corrected phase difference between the data signals as derived from the phase differences between the processed data signals, along with the evaluation module which serves to determine the mass flow rate on the basis of the corrected phase difference, is implemented in the evaluation system 7.

In the design example illustrated, the processed data signals are digitized by an analog/digital converter 6, mentioned above, prior to the determination of the phase differences. In the example shown, the sampling of the data signals is asynchronous for which purpose a sampling check switch 9 is provided. This sampling check switch feeds the data signals, processed by the input stages 3, 4, 5, in any given sequence to the input contact of the analog/digital converter 6. For the analog preprocessing, the input stages 3, 4, 5 are each provided with a low-pass filter 10 and a sample-and-hold element 11. The sampling check switch 9 also receives, by way of an input contact 12, an additional data signal which could be, for instance, the data signal from a temperature probe. Given that per time unit the determination of the corrective phase difference for the purpose of digital phase difference measurements requires fewer data samples of the input signal processed by the third input stage 5, the design version illustrated utilizes the freed-up capacity of the analog/digital converter 6 for converting data signals emanating, for instance, from the temperature probe.

According to this invention, an uncorrected phase difference in the example shown between the first data signal processed with the aid of the first input stage 3 and the second data signal processed with the aid of the second input stage 4 is measured by means of the first phase detector implemented in the evaluation system 7. This invention also provides for the measurement, preferably with a reduced number of data samples, of a first corrective phase difference between the first data signal processed with the aid of the first input stage 3 and the first data signal processed with the aid of the third input stage 5, and alternately of a second corrective phase difference between the second data signal processed by the second input stage 4 and the second data signal processed by means of the third input stage 5.

Obviously, the following applies:

$$\phi_1 = \phi_S + \phi_A - \phi_B$$

where $\phi_1$ = uncorrected phase difference $\phi_S$ = corrected phase difference $\phi_A$ = phase shift in first input stage 3

$\phi_B$ = phase shift in second input stage 4

And also:

$$\phi_2 = \phi_A - \phi_C$$

and $$\phi_3 = \phi_B - \phi_C$$

where $\phi_2$ = first corrective phase difference $\phi_3$ = second corrective phase difference $\phi_C$ = phase shift in third input stage 5

Hence the following conclusion:

$$\phi_1 - \phi_2 + \phi_3 = \phi_S + \phi_A - \phi_B - (\phi_A - \phi_C) + (\phi_B - \phi_C)$$

In plain language, this means that the effect of the phase shifts within the input stages is eliminated by virtue of the fact that the corrected phase difference between the data signals is determined based on the sum of the uncorrected phase difference and the difference between the first and the second corrective phase differences.

Having described the invention, what is claimed as new and secured by Letters Patent is:

1. A method of correcting the phase difference between first and second data signals from a Coriolis mass flowmeter of the type having a measurement circuit which includes first, second and third parallel input stages for processing the first and second data signals and a first phase detector and at least one additional phase detector for receiving the first and second processed data signals from said first, second and third parallel input stages, said method comprising the steps of delivering the first data signal continuously to the first parallel input stage to produce a first processed data signal from the first parallel input stage;

delivering the second data signal continuously to the second parallel input stage to produce a second processed data signal from the second parallel input stage;

delivering the first and second data signals alternately to the third parallel input stage to produce a third processed data signal from the third parallel input stage;

routing the first and second processed data signals from the first and second parallel input stages to the first phase detector to produce an uncorrected phase difference;

routing the first and third processed data signals from the first and third parallel input stages and the second and third processed data signals from the second and third parallel input stages to said at least one additional phase detector to produce first and second corrective phase differences, and producing a corrected phase difference by summing the uncorrected phase difference and the difference between the first and second corrective phase differences.

2. The method defined in claim 1, including the additional step of digitizing the first, second and third processed data signals before routing them to the first phase detector or the at least one additional phase detector.

3. The method defined in claim 2, including the additional step of interrupting the digitizing of the first, second and third processed data signals, and digitizing process variables during these interruptions.

4. The method defined in claim 3, including digitizing at least one temperature variable.

5. A method of correcting the phase difference between first and second data signals using a measurement circuit which includes first, second and third parallel input stages for processing the first and second data signals and a first phase detector and at least one additional phase detector for receiving the first and second processed data signals from said first, second and third parallel input stages, said method comprising the steps of delivering the first data signal continuously to the first parallel input stage to produce a first processed data signal from the first parallel input stage;

delivering the second data signal continuously to the second parallel input stage to produce a second processed data signal from the second parallel input stage;

delivering the first and second data signals alternately to the third parallel input stage to produce a third processed data signal from the third parallel input stage;

routing the first and second processed data signals from the first and second parallel input stages to the first phase detector to produce an uncorrected phase difference;

routing the first and third processed data signals from the first and third parallel input stages and the second and third processed data signals from the second and third parallel input stages to said at least one additional phase detector to produce first and second corrective phase differences, and producing a corrected phase difference by summing the uncorrected phase difference and the difference between the first and second corrective phase differences.

6. The method defined in claim 5, including the additional step of digitizing the first, second and third processed data signals before routing them to the first phase detector or the at least one additional phase detector.

7. The method defined in claim 6, including the additional step of interrupting the digitizing of the first, second and third processed data signals, and digitizing process variables during these interruptions.

8. The method defined in claim 7, including digitizing at least one temperature variable.

* * * * *